(12) United States Patent
Feng et al.

(10) Patent No.: US 7,283,092 B2
(45) Date of Patent: Oct. 16, 2007

(54) ENHANCED SWITCHED-BEAM ANTENNA ARRANGEMENT

(75) Inventors: Minghai Feng, Beijing (CN); Yuan Zhu, Beijing (CN); Wujie Hu, Beijing (CN)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/133,277

(22) Filed: May 20, 2005

(65) Prior Publication Data

US 2006/0202892 A1    Sep. 14, 2006

(30) Foreign Application Priority Data

Mar. 11, 2005  (EP) .................................. 05005406

(51) Int. Cl.
*H01Q 3/02* (2006.01)
(52) U.S. Cl. ..................... 342/374; 342/372; 455/277.1
(58) Field of Classification Search ................ 342/368, 342/372, 374; 455/271, 277.1
See application file for complete search history.

(56) References Cited

U.S. PATENT DOCUMENTS

| | | | |
|---|---|---|---|
| 5,194,873 A * | 3/1993 | Sickles, II | 342/374 |
| 5,714,957 A | 2/1998 | Searle et al. | |
| 6,236,866 B1 * | 5/2001 | Meyer et al. | 455/562.1 |
| 6,393,303 B1 | 5/2002 | Katz | |
| 6,496,142 B1 * | 12/2002 | Iinuma | 342/368 |
| 6,600,456 B2 * | 7/2003 | Gothard et al. | 343/834 |
| 6,968,022 B1 * | 11/2005 | Poor et al. | 375/346 |
| 2002/0068590 A1 | 6/2002 | Suzuki et al. | |

* cited by examiner

*Primary Examiner*—Dao L. Phan
(74) *Attorney, Agent, or Firm*—Squire, Sanders, & Dempsey, LLP

(57) ABSTRACT

Switched-beam antenna arrangement means use a method of controlling an antenna pattern of such antenna arrangement means. Each antenna pattern of a predetermined number of fixed antenna patterns is allocated to a predetermined time slot of a time multiplexed signal. The switched-beam antenna arrangement means is switched to generate the fixed antenna patterns during their allocated time slots. Thereby, any user can choose between distinct beam patterns by selecting an appropriate time slot, so that the risk that the user is located at the intersection area of two beams is greatly reduced.

16 Claims, 4 Drawing Sheets

ENHANCED SWITCHED-BEAM ANTENNA ARRANGEMENT

FIELD OF THE INVENTION

The present invention relates to switched-beam antenna arrangement means, such as a switched-beam smart antenna for a base station device, and a method of controlling an antenna pattern of such antenna arrangement means.

BACKGROUND OF THE INVENTION

Smart antennas are antenna arrays installed at base station (BTS) sites and are one of the key features of TD-SCDMA (Time Division-Synchronous Code Division Multiple Access), which was developed in China. TD-SCDMA, as one of the three $3^{rd}$ generation (3G) wireless communication system standards, uses TDMA together with CDMA as multiple access method, especially it adopts TDD (Time Division Duplex) as its duplex mode, which provides rather convenience for application of smart antennas. In a typical TD-SCDMA configuration, the antenna array of the smart antenna is a circular array composed of eight antenna elements. The TD-SCDMA smart antenna system combines the multiple antenna elements from the antenna array using beam forming concepts and other sophisticated signal processing algorithms to transmit and receive adaptively.

In general, a smart antenna system is composed of N antenna elements with N related feed cables and N coherent RF (Radio Frequency) transceivers in the RF part. It serves to provide beam forming which points to a particular terminal device (or user equipment (UE) in 3G terminology). Thus, instead of "illuminating" the entire cell with radio power, the base station sends power only to the terminals that are active in the cell. This illumination has the immediate benefit of increasing the power received by the terminals in the cell' while reducing mobile-to-mobile interference in the cell and interference in nearby cells.

Smart antenna systems in TD-SCDMA and TDD systems can be very effective because these systems use the same frequency for both the uplink and the downlink and therefore can assume a nearly identical channel in both directions. Smart antennas are therefore widely recognized as a promising technology to address the demand of wireless communication systems capacity and coverage when employed in place of traditional antenna to reduce non-desired user interference from space domain.

Smart antennas are usually categorized as either a switched-beam or adaptive array antennas. Compared with adaptive array antennas, switched-beam antennas are less complex and easier to implement, which is attractive to either manufacturers or operators. Furthermore, switched-beam smart antenna systems offer a robust implementation against multi-path propagation effects and reduced complexity that is inherent with fully adaptive smart antenna implementations.

However, one of the main limitations of switched-beam smart antennas is the phenomenon of "scalloping", which means that the power received from one UE by one BTS, which employs switched beam smart antennas, is fluctuant when the UE moves around the BTS. When the DOA (Direction Of Arrival) is diverging from the axis of the selected beam, the available antenna gain decreases.

FIG. 2 shows an example of a fixed antenna pattern of a conventional smart antenna with a plurality of fixed beams. In FIG. 2, UE1 is located at the intersection area of beam A and beam B, while UE2 and UE3 are located at the maximum gain direction of beam A and beam B. No matter whether UE1 selects beam A or beam B, its signal would be discriminated against UE2 or UE3 because the antenna gain for UE1 at the intersection area of two beams is much less than the maximum antenna gain of beam A or beam B. Hence, UE 1 cannot make use of the maximum antenna gain from either UE2 or UE3's beam. Then, if considering UE1, the interference of UE2 or UE3 might have higher antenna gain than the signal received from UE1, which is not what should be expected from the effect of the switched-beam smart antennas.

For switched-beam smart antennas, the beam pattern and the beam width are typically fixed and cannot be unlimited narrow because of the limitations on implementation cost and hardware feasibility. Thus, when a user happens to be not located around a beam peak area, this "scalloping" problem will be unavoidable.

Document US20020068590A1 discloses a wireless communication method and system using an antenna array with variable beam direction. In particular, the beam direction of a particular beam is controlled to vary in different time slots. In order to prevent radio waves from respective base stations from interfering with each other, they are controlled to be radiated at different times, thereby avoiding interference. To achieve this, the operations of the different base stations are managed to be synchronized with each other, so that the directions in which the base stations radiate radio waves can be timely switched to avoid interference. However, this prior art does serves to prevent beam interference but not the above scalloping problem.

SUMMARY OF THE INVENTION

It is therefore an object of the present invention to provide array antenna arrangement means, by means of which the scalloping problem can be avoided without substantially increasing complexity.

This object is achieved by a method of controlling an antenna pattern of a switched-beam antenna array, said method comprising the steps of:
   providing a predetermined number of fixed antenna patterns;
   allocating to each of said fixed antenna patterns a predetermined time slot of a time multiplexed signal; and
   switching said switched-beam antenna array to generate said fixed antenna patterns during their allocated time slots.

Furthermore, the above object is achieved by switched-beam antenna arrangement means for controlling an antenna pattern, said antenna array comprising:
   pattern forming means for providing a predetermined number of fixed antenna patterns; and
   switch control means for controlling said switched-beam antenna array to generate each of said fixed antenna patterns during a respective different allocated time slot of a time-multiplexed signal.

Accordingly, time domain slots are linked to the space domain, any user has several distinct antenna patterns to choose from. Consequently, the risk that the user is located at an intersection area of two beams of an antenna pattern is greatly reduced. The proposed joint use of time and space domain processing method leads to reduced intra-cell and inter-cell interference. Moreover, the "scalloping" phenomenon of switched-beam antenna can be reduced substantially to enhance performance of switched-beam antenna arrays to the degree of a "discrete" adaptive antenna, wherein the performance is dependent on the number of available working time slots. A huge gain can therefore be achieved at negligible additional cost.

Furthermore, slow DCA can be achieved by selecting different beam patterns for different slot attributes. The beam patterns can also be adjusted slowly to spread traffic among different slots.

A terminal device or user equipment may select a time slot with maximum antenna gain for accessing a base station device connected to the switched-beam antenna arrangement means.

Additionally, each of the fixed antenna patterns may be adapted to cover a reception area of the antenna arrangement means in a complementary manner with respect to the other fixed antenna array. Thereby, gain losses at the beam intersections can be minimized due to optimized overlapping of the different antenna patterns. Each of the different fixed antenna patterns may comprise a plurality of fixed beams pointing into different angular directions.

According to a first option, the switching step may comprise switching a plurality of transmission or reception paths of antenna elements to a predetermined one of a plurality of outputs of a pattern forming unit. In this case, the pattern forming unit has available pattern forming parameters for all selectable antenna patterns, wherein the different outputs are allocated to specific antenna patterns and thus time slots.

According to an alternative second option, the switching step may comprise switching dedicated pattern forming parameters to a pattern forming unit. In this case, the pattern forming unit is configured to generate or form a selected antenna pattern, while pattern forming parameters required for generating or forming a different antenna pattern are selectively switched to the pattern forming unit. The individual pattern forming parameters can be stored in a corresponding memory.

Furthermore, a direction of arrival of a received signal can be measured and an intra-cell handover to a different one of said time slots can be triggered based on the measuring result.

Advantageous further developments are defined in the dependent claims.

BRIEF DESCRIPTION OF THE DRAWINGS

The present invention will now be described on the basis of preferred embodiments with reference to the accompanying drawings in which.

DESCRIPTION OF THE PREFERRED EMBODIMENTS

Figure 1:
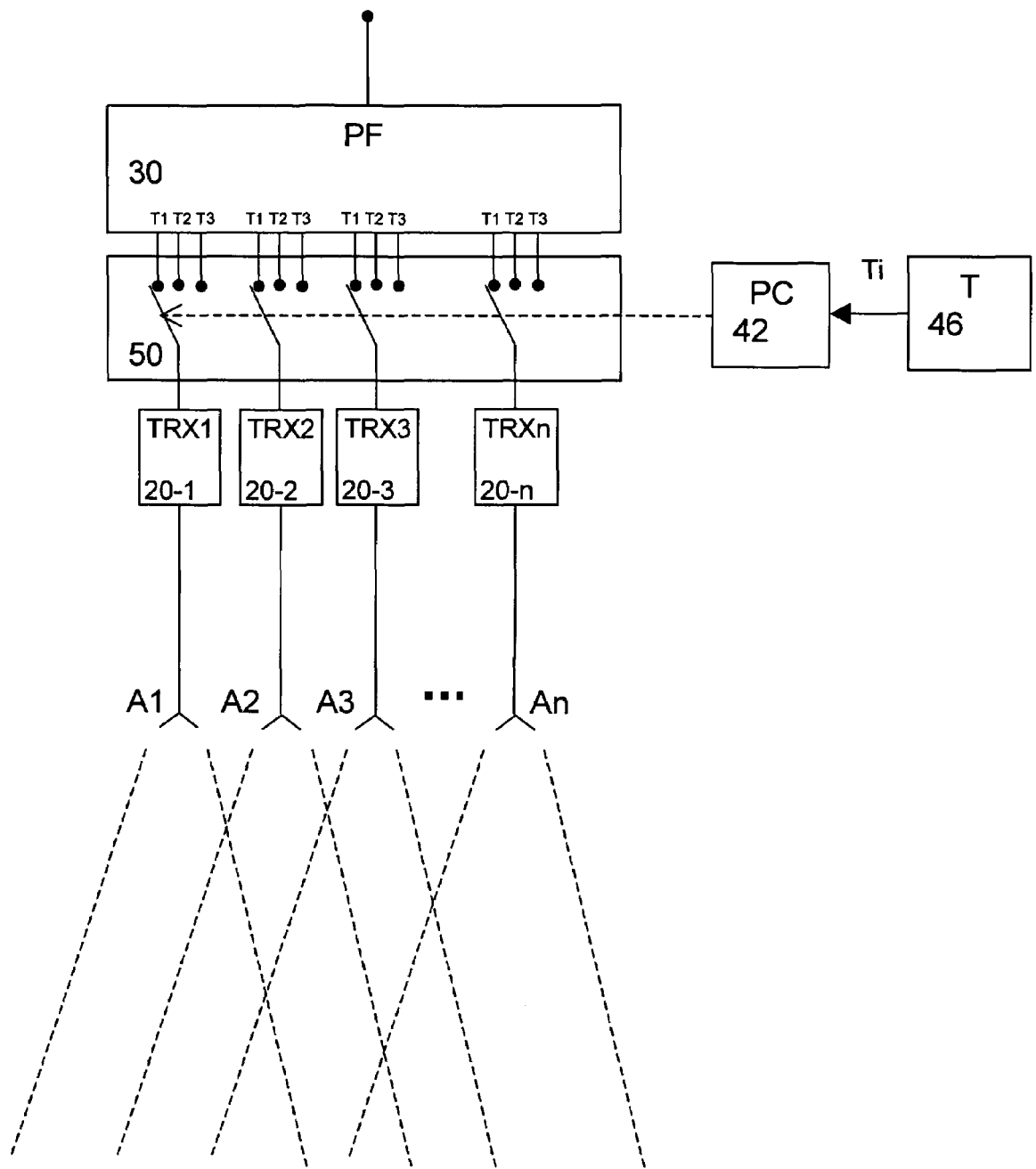
FIG. 1 shows a schematic block diagram of a beam-switched antenna array according to a first preferred embodiment.

The preferred embodiments will now be described on the basis of a smart antenna for a TD-SCDMA system, as shown in FIG. 1.

FIG. 1 shows a schematic block diagram of a controllable switched-beam smart antenna according to the first preferred embodiment. The antenna array of the smart antenna is composed of N antenna element A1 to An and N coherent transceivers 20-1 to 20-n for transmitting and receiving time-multiplexed TD-SCDMA signals via the respective antenna elements A1 to An. The antenna array may be a circular antenna array or a linear antenna array, where the number of elements may be set to N=8 for example. Due to the fact that the antenna elements A1 to An are arranged at different locations, the phases of the received or transmitted signals will differ with respect to a predetermined reception point.

To generate or form a desired antenna pattern, the individual transmission or reception signals of each of the antenna elements A1 to An are processed using beam forming or pattern forming parameters in a pattern forming unit 30 to achieve a desired antenna pattern with maxima or beam pointing into respective predetermined directions. The pattern forming parameters may be complex weights which can be calculated or read from a memory based on a desired direction for transmission or reception of a signal.

According to the preferred embodiments, the performance of the switched-beam smart antenna is enhanced by making use of the time-multiplexed nature of the TD-SCDMA system. To alleviate the "scalloping" phenomenon of switched-beam antennas, time and space domain are jointly utilized. In particular, the antenna pattern formed by the pattern forming unit 30 is continuously adapted or changed in different time slots of the time-multiplexed signal. Thus, at different timings, the switched-beam smart antenna will cover different areas of the cell or illumination area. In the whole time domain, the beams of the switched patterns could cover the whole cell complementary, e.g. the maxima or beams of one pattern are located substantially at the minima or beam intersections of the other pattern(s). For an example, in the case of 3 uplink time slots, a user has three distinct beam patterns to choose in the time domain, thus the risk that the user is located at the intersection area of two beams is reduced. Thereby, the performance of the switched-beam smart antenna can be enhanced without adding implementation complexity.

In a symmetric resource allocation mode of the preferred embodiments, the system may use timeslots T1, T2 and T3 for the uplink direction from a terminal device to the base station device, where the smart antenna may be located, and timeslots T4, T5 and T6 for the opposite downlink direction.

In the following, only the uplink direction is described, while it is apparent that the control method for the downlink direction is the same as for the uplink direction.

Figure 2:
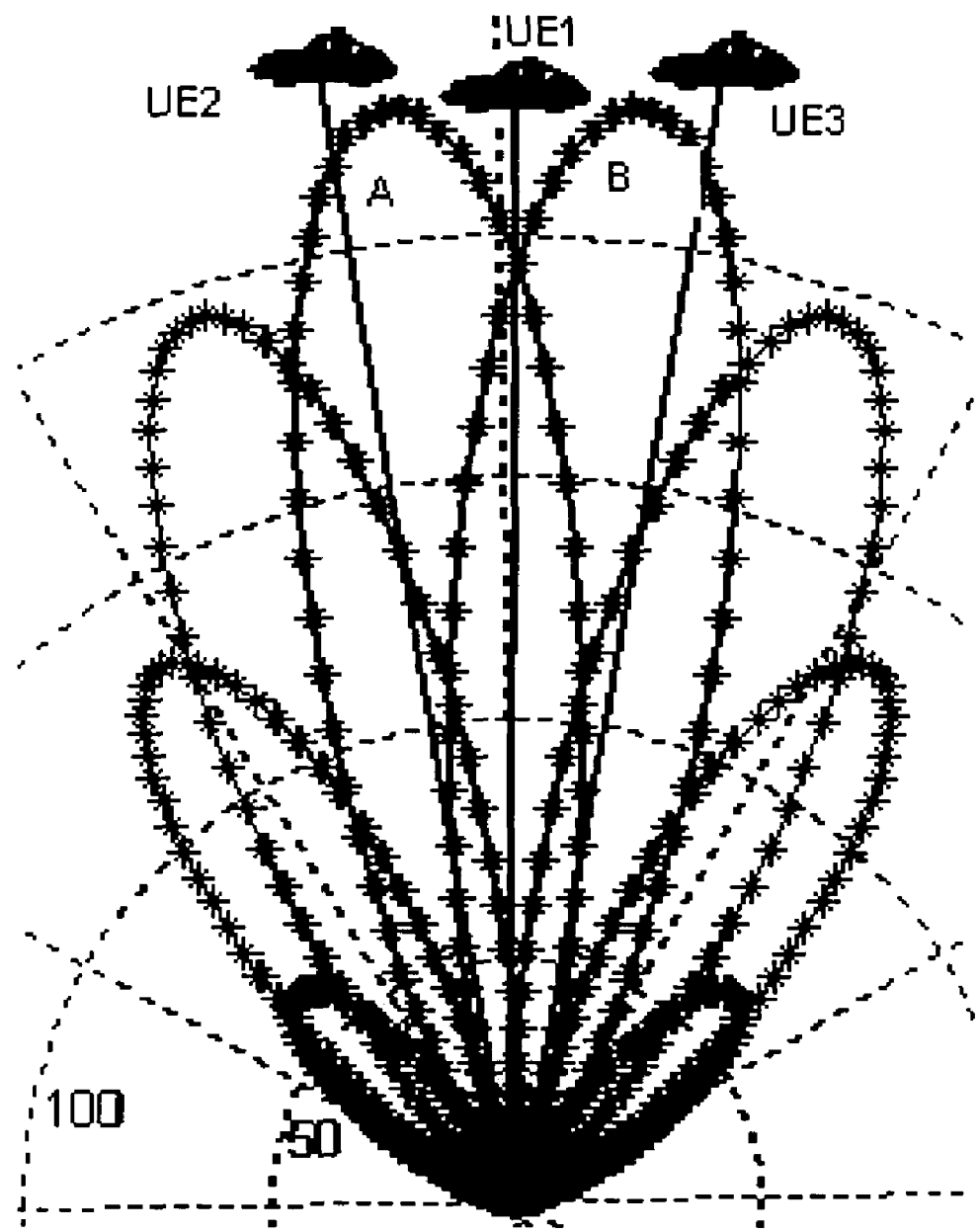
FIG. 2 shows an antenna pattern of a conventional smart antenna with a plurality of fixed beams, which are maintained for all time slots.

In the traditional or conventional switched beam antennas system of FIG. 2, all timeslots have the same beam pattern. In contrast thereto, according to the preferred embodiments, each time slot is linked to or allocated to a specific switched-beam antenna pattern. In the first preferred embodiment, the pattern forming unit 30 has three outputs for each of the antenna elements A1 to An, each output being allocated to one of the three time slots T1 to T3.

Furthermore, a switching arrangement 50 is provided, the function of which is schematically shown in FIG. 1. Of course, implementation of this switching arrangement 50 can be based on any suitable electronic hardware-based or software-base solution which reflects the following functionality. Based on a slot timing of the time-multiplexed signal as obtained from a timing circuit 46, a pattern control unit 42 generates a control signal or output at and in synchronism with the three time slots T1 to T3. Based on this control signal, the switching arrangement 50 is controlled to successively contact the transceivers 20-1 to 20-n to the respective one of the outputs of the pattern forming unit 30, to apply a pattern forming processing based on the pattern forming parameters allocated to the individual time slot Ti(i=1 to 3) as selected by the switching arrangement 50. Thus, the switching arrangement 50 serves to select a particular set of processing operations for each of the antenna elements A1 to An in dependence on the current time slot, so as to provide a fixed link between the time slots and the antenna patterns.

Figure 3:
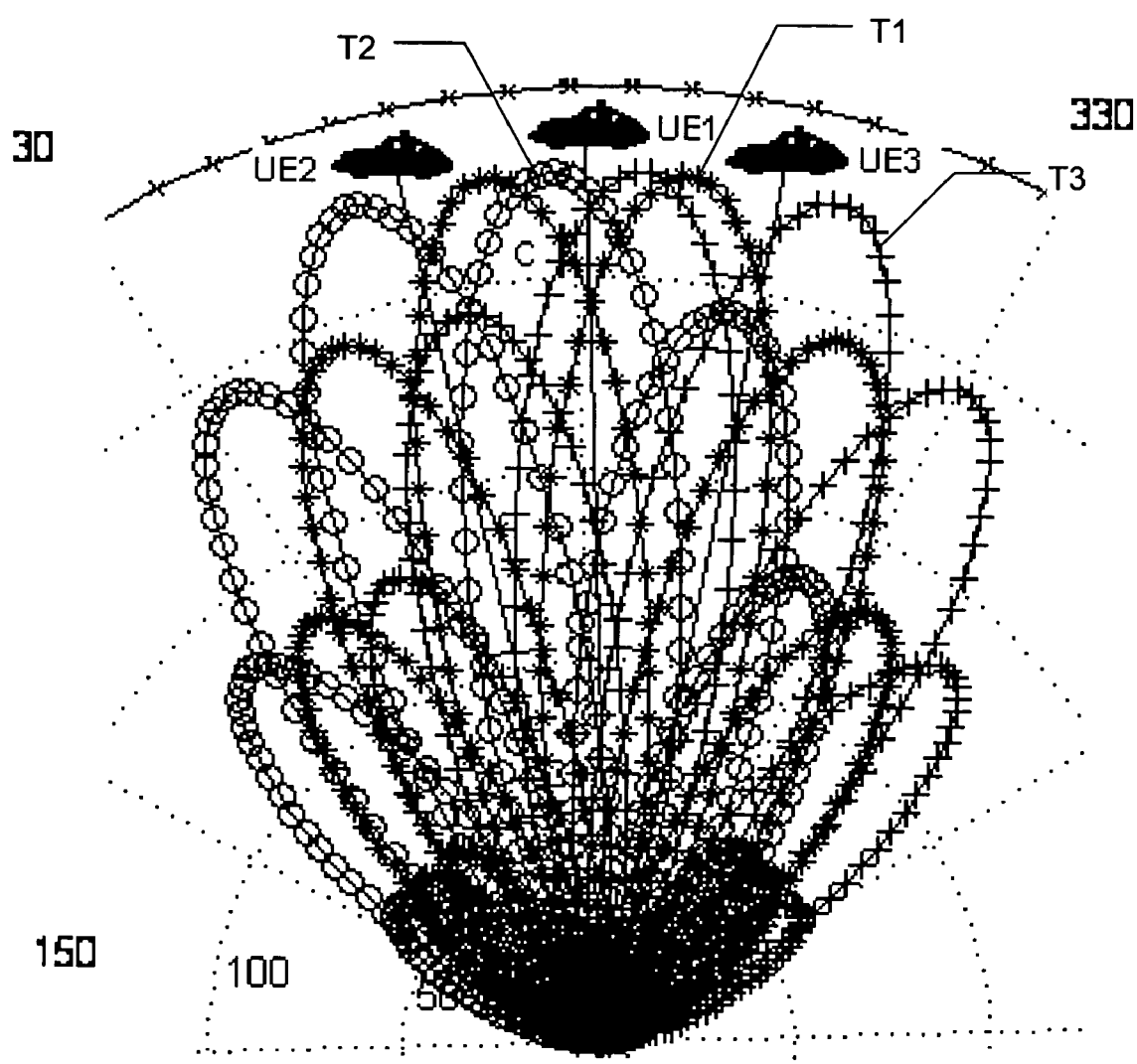
FIG. 3 shows an antenna pattern of a proposed smart antenna according to the preferred embodiments.

FIG. 3 shows an example of an antenna pattern of the proposed smart antenna according to the preferred embodiments. As can be gathered from FIG. 3, each one of three different beam patterns marked by "*", "+" and "o" belongs to a different timeslot T1, T2 and T3 and is arranged complementary to the other two patterns. That is, the three antenna patterns or sets of beam patterns cover the cell in a complementary manner. As a result, each time domain slot T1 to T3 is linked to a space property, so that any user has three distinct beam patterns to choose for optimum coverage or signal power. Consequently, the risk that the user is located at the intersection area of two beams is greatly reduced, approximately one third in the present example of three different antenna patterns. The impairment of the "scalloping" phenomenon is thus hugely decreased.

In FIG. 3, the three antenna patterns are provided as candidates, and if UE1 chooses timeslot T2 to access, i.e. chooses the antenna pattern linked to the time slot T2, then it can communicate with maximum gain of beam C in the time slot T2.

This approach can thus be regarded as a kind of "discrete" adaptive smart antenna, it could choose or adapt its transceiver antenna beam pattern discretely when a mobile terminal accesses or moves in the system, by determining its different working time slot, but not like a true adaptive antenna which calculates a new weighting vector.

Figure 4:
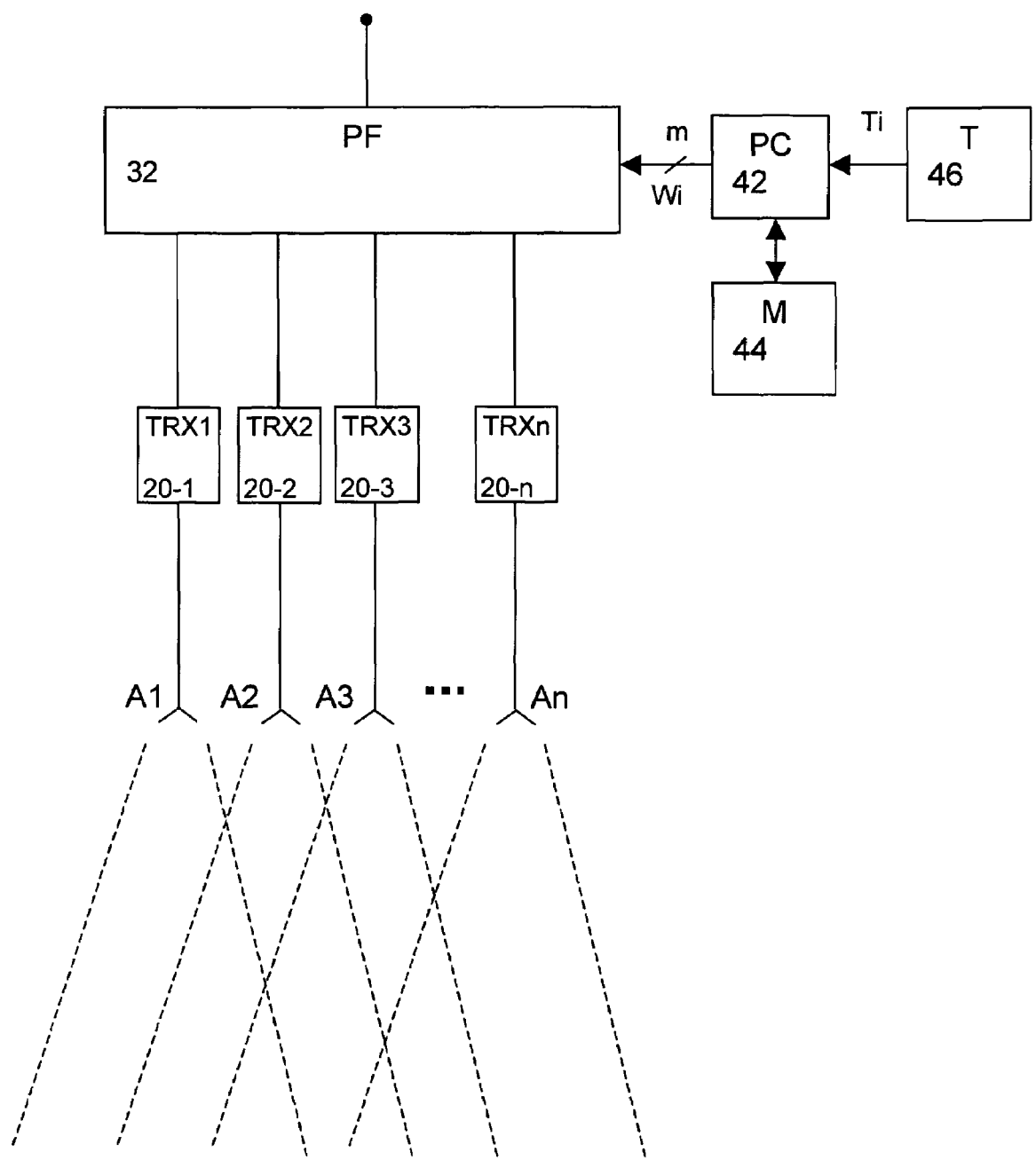
FIG. 4 shows a schematic block diagram of a beam-switched antenna array according to a second preferred embodiment.

FIG. 4 shows a schematic block diagram of a controllable switched-beam smart antenna according to the second preferred embodiment.

In the second preferred embodiment, a set of pattern forming parameters Wi are stored in memory 44 for all selectable antenna patterns which are linked to the individual time slots T1 to T3. Again, the timing circuit 46 provides the slot timing to the pattern control unit 42 which accesses the memory 44, e.g. by applying a predetermined memory address in case of an addressable memory or a clock signal in case of ring-type of memory, so as to read the desired pattern forming parameters Wi for the actual one of the time slots T1 to T3. The read pattern forming parameter Wi, which may consist of m individual parameters, e.g. complex weights, are then supplied to a pattern forming unit 32 which applies the supplied pattern forming parameters Wi to the pattern forming processing so as to generate or form the desired antenna pattern allocated to the actual time slot.

Thus, similar to the first preferred embodiment, a switching function is controlled by the pattern control unit 42 and the timing circuit 46 so as to select a particular set of processing operations, defined by the read pattern forming parameters Wi, for each of the antenna elements A1 to An in dependence on the current time slot, so as to provide a fixed link between the time slots and the antenna patterns.

It is apparent that the present invention can be implemented with more than three selectable antenna patterns. If there are enough time slots to arrange enough complementary antenna patterns with just little angle difference, then the switched-beam antenna will be very close to an adaptive antenna from interference cancellation's point of view, and almost every user located in any direction could find an antenna pattern with a beam peak pointed to it, so as to get a relative beam gain to all other users or terminal devices.

Another modification may be that a measured DoA of a signal received from a terminal device, e.g. a mobile terminal, triggers an intra-cell handover, which would move the terminal to a different slot having a different antenna pattern compared with the previous slot. This can be achieved by having the base station device initiate a suitable handover signalling.

The possibility of intra-cell handover should increase twice as much as the conventional method if three slots are used. Therefore, it is important to know how long an intra-cell handover can take. In case of a speed of a mobile terminal of v=30 kmph (i.e. 8.3 m/s), a radial distance of r=300 m from the base station (BTS), n=4 beams, an LCR_TDD system with s=3 slots for uplink and downlink, respectively, a subframe length of s1=5 ms, and a sector angle of sa=120 degrees, the mean value of the intra-cell handover period (HOP) can be calculated as follows:

$$HOP=2*pi*r*sa/(n*s)/360/v=2*pi*300*120/(4*3)/360/8.3=6.3 \ s$$

This mean value of intra-cell handover period should be acceptable. Thus, the proposed method will not lead to serious overload although it increases the intra-cell handover frequency.

It is noted that the present invention is not restricted to the above described preferred embodiments, but may be implemented in any switched-beam antenna arrangement for any kind of wireless communication system for time multiplexed signals, e.g. TDMA signals. Furthermore, the blocks of FIGS. 1 and 4 may be implemented as discrete hardware units or circuits or as software routines based on which a signal processing function or unit is controlled to perform the described functional steps. The preferred embodiments may thus vary within the scope of the attached claims.

The invention claimed is:

1. A method, comprising:
providing a predetermined number of fixed antenna patterns;
allocating, to at least one of said fixed antenna patterns, a predetermined time slot of a time multiplexed signal;
switching a switched-beam antenna array to generate said fixed antenna patterns during allocated time slots; and
controlling an antenna pattern of a switched-beam antenna array using said switching.

2. The method according to claim 1, further comprising:
providing a time division multiple access signal as said time multiplexed signal.

3. The method according to claim 1, further comprising:
selecting a time slot with maximum antenna gain for accessing a base station device with said switched-beam antenna array.

4. The method according to claim 1, further comprising:
covering a transmission or reception area of said switched-beam antenna array in a complementary manner with respect to other fixed antenna patterns using the at least one of said fixed antenna patterns.

5. The method according to claim 1, further comprising:
providing, as the at least one of said fixed antenna patterns, a plurality of fixed beams pointing in different angular directions.

6. The method according to claim 1, wherein said switching comprises switching a plurality of transmission of receptions paths of antenna elements to a predetermined one of a plurality of outputs of a pattern forming unit.

7. The method according to claim 1, wherein said switching comprises switching dedicated pattern forming parameters to a pattern forming unit.

8. The method according to claim 1, further comprising:
measuring a direction of arrival of a received signal; and
triggering an intra-cell handover to a different one of said allocated time slots based on a result of said measuring.

9. A switched-beam antenna arrangement, comprising:
pattern forming means for providing a predetermined number of fixed antenna patterns; and
switch control means for controlling a switched-beam antenna array to generate at least one of said fixed antenna patterns during a respective different allocated time slot of a time-multiplexed signal.

10. A switched-beam antenna arrangement, comprising:
a pattern forming unit configured to provide a predetermined number of fixed antenna patterns; and
a switch control unit configured to control a switched-beam antenna array to generate at least one of said fixed antenna patterns during a respective different allocated time slot of a time-multiplexed signal.

11. The switched-beam antenna arrangement according to claim 10, wherein said switch control unit is configured to control a switching unit to switch a plurality of transmission or reception paths of antenna elements to a predetermined one of a plurality of outputs of said pattern forming unit.

12. The switched-beam antenna arrangement according to claim 10, wherein said switch control unit is configured to switch dedicated pattern forming parameters to said pattern forming unit.

13. The switched-beam antenna arrangement according to claim 12, further comprising:
a memory configured to store said dedicated pattern forming parameters.

14. The switched-beam antenna arrangement according to claim 10, wherein said switched-beam antenna array comprises a smart antenna of a time division multiple access system.

15. A base station device, comprising:
a switched-beam antenna arrangement, said switched-beam antenna arrangement comprising
a pattern-forming unit configured to provide a predetermined number of fixed antenna patterns, and
a switch control unit configured to control a switched-beam antenna array to generate each of said fixed antenna patterns during a respective different allocated time slot of a time-multiplexed signal.

16. The base station device according to claim 15, further comprising:
a measuring unit configured to measure a direction of arrival of a received signal; and
a triggering unit configured to trigger an intra-cell handover to a different time slot based on a result from said measuring unit.

* * * * *